Sept. 9, 1924.   1,507,936
F. G. SCHMITT
STORAGE BATTERY TERMINAL
Filed March 26, 1920
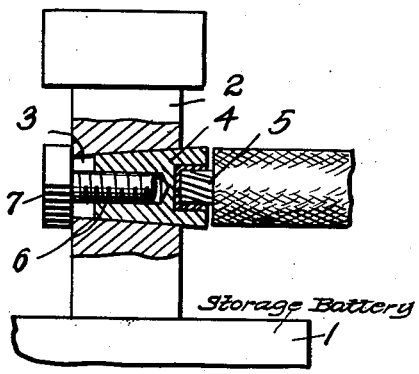
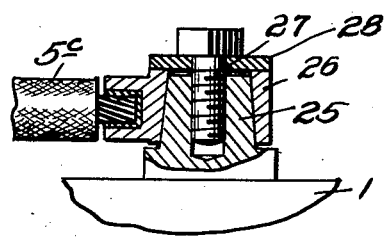
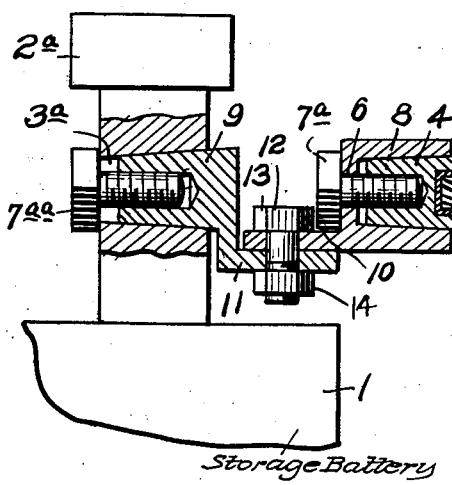
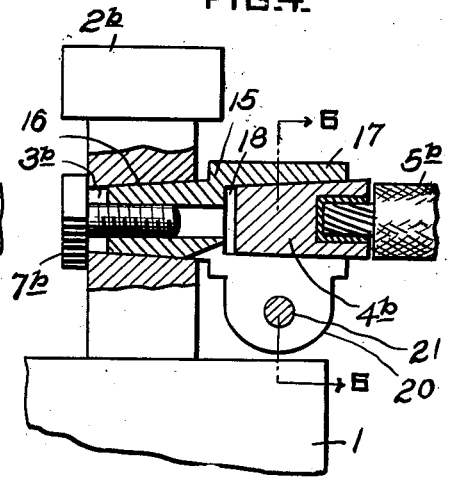
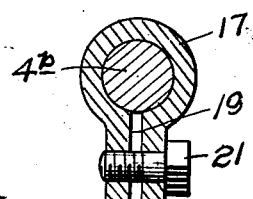
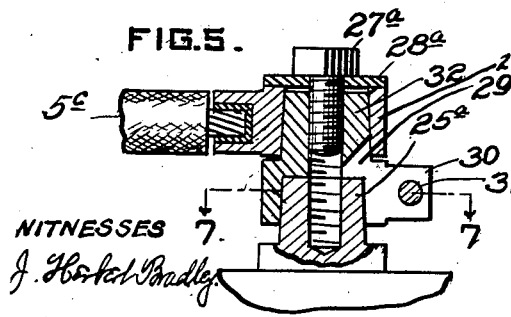
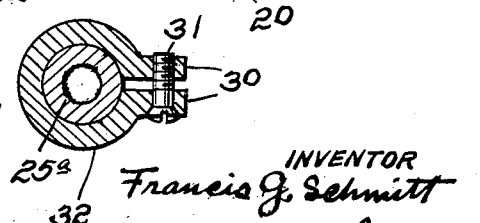
WITNESSES
J. Herbert Bradley
Ja. Baily Brown
INVENTOR
Francis G. Schmitt
by Winter & Brown
his Attorneys Patented Sept. 9, 1924.

1,507,936

UNITED STATES PATENT OFFICE.

FRANCIS G. SCHMITT, OF LEETSDALE, PENNSYLVANIA.

STORAGE-BATTERY TERMINAL.

Application filed March 26, 1920. Serial No. 369,015.

*To all whom it may concern:*

Be it known that I, FRANCIS G. SCHMITT, a resident of Leetsdale, in the county of Allegheny and State of Pennsylvania, have invented a new and useful Improvement in Storage-Battery Terminals, of which the following is a specification.

This invention relates to the terminals of storage batteries.

An object of the invention is to provide non-corrodible means for attaching the terminals of circuit wires to the terminals of storage batteries. More particularly the object is to provide non-corrodible means for attaching the terminals of circuit wires to the present standard storage battery, without any alteration in the standard parts now used.

Referring to the drawings, Fig. 1 is a partial section showing a terminal of a standard storage battery, and the ordinary means of connecting a circuit wire thereto; Fig. 2 is a sectional view of the ordinary method of attaching the end of a circuit wire to another form of storage battery terminal; Fig. 3 is a partial sectional view showing one form of this invention applied to the form of standard storage battery post shown in Fig. 1; Fig. 4 is a partial section showing a modified form of the attachment; Fig. 5 is a partial section showing the invention as applied to the form of terminal post illustrated in Fig. 2; Fig. 6 is a section on the line 6—6 of Fig. 4; and Fig. 7 is a section on the line 7—7 of Fig. 5.

In the ordinary storage battery as used in the electrical systems of automobiles a great deal of difficulty is experienced because of the corrosion of the battery terminals, at the point of connection of the circuit wires. Storage batteries contain a very strong electrolyte, which corrodes the metals now employed for connecting the battery to the circuit wire. This corrosive action is so strong that frequently the terminal plugs of the wires cannot be released from the posts without danger of breaking the tops of the battery jars. The connection between the wires and battery must be a very tight contact, and must be permanently held in position, since it is for the purpose of transmitting a current of very low voltage but high amperage, and is subject to a large amount of vibration.

The present invention has for its particular object the provision of readily attachable parts which may be made of a non-corrodible metal, such as "Monel" metal, and which may be applied to the standard storage battery of automobiles, without the necessity of changing any part of the battery, and without the use of any special tools, and by unskilled workmen.

Referring to Fig. 1 the storage battery cell 1 has a terminal post 2, ordinarily made of lead. This post has a transverse tapered bore 3, which is adapted to receive a tapered plug 4, soldered on the end of a wire 5, forming a part of the electrical circuit served by the battery. Ordinarily this plug is held securely clamped in the bore of terminal post 2 by means of a screw 6 having a square head 7, adapted to fit on the outside of the post, all as shown in Fig. 1.

The post is ordinarily made of lead, the plug 4 is ordinarily made of brass, or copper, and the screw 7 is usually of lead.

The present invention consists in applying to these standard parts supplementary terminals, preferably made of Monel metal, or other non-corrodible conducting material. A cap 8, the inside of which is tapered to fit on the end of plug 4 is applied thereto and fastened on by means of a screw $7^a$, similar to the screw 7. A plug 9 is fitted into the bore $3^a$ of post $2^a$, and is permanently attached therein by means of a screw $7^{aa}$. The two parts 8 and 9 are preferably made of non-corrodible metal, and are securely attached to the wire $5^a$ and post $2^a$ respectively, as illustrated. The cap 8 has a flat integral perforated tongue 10 and the plug 9 has a cooperating flat integral perforated tongue 11. A bolt 12 is adapted to connect the two tongues 10 and 11. This bolt has an enlarged head 13, one side of which bears against the end of the screw $7^a$, so as to prevent rotation of the bolt when the nut 14 is unscrewed.

By this means a non-corrodible connection is provided, which may be readily attached to the standard storage battery post and as readily detached, and a cooperating non-corrodible member is provided which may be attached to the terminal of an ordinary wire circuit and as readily detached, and the two may be easily attached to and detached from each other by means of a simple bolt 12. The resulting connection is much easier to get at, and is not affected by acids. Obviously the parts may be turned so that nut 14 is up instead of down as illustrated.

In Fig. 4 a modification is provided in that only a single non-corrodible part 15 is provided. This consists of a tapered extension 16 adapted to extend into the tapered bore 3$^b$ of the post 2$^b$ and be permanently fastened therein by means of the standard clamping screw 7$^b$, as illustrated. The other end of the member 15 is in the form of a cap 17 having a tapered internal bore 18. The side wall of this cap has a slot 19, and on the inside of this slot are projecting perforated flanges 20, through which extends a compression bolt 21, as shown in Fig. 6. The bore 18 is adapted to receive the standard tapered terminal plug 4$^b$, to which is attached a circuit wire 5$^b$. It will be understood that the member 15 is permanently attached to the post 2$^b$, as illustrated, and that the battery is connected to and disconnected from the circuit by attachment and detachment of the plug 4$^b$ in the cap 17, by means of the expansion joint referred to above. The member 15 is preferably non-corrodible and therefore this form of connection is not open to the objections found in the present standard forms of attachment. Connection is very readily made by means of the member illustrated, and this may be applied to storage battery terminals as they are now made without change.

In Fig. 2 is illustrated a connection adapted to be used with the standard form of terminal shown in Fig. 2, which comprises a tapered post 25, extending from the battery. Over this post a terminal member 26 is placed, and clamped in position by means of screw 27 and washer 28. The circuit wire 5$^c$ is attached to the member 26, as illustrated.

In Fig. 5 is shown a non-corrodible member 29, which has a tapered bore adapted to fit over the post 25$^a$, and be clamped thereon by an expansion joint comprising the wings 30 and the screw 31 extending therethrough, as shown in section in Fig. 7. The upper portion of the member 29 forms a tapered post 32, corresponding in shape and size to the standard post 25. Over this tapered post the terminal member 26$^a$ is placed, and clamped down by means of washer 28$^a$ and terminal screw 27$^a$, all as illustrated in Fig. 5. This also results in a non-corrodible connection, which may be applied to the present standard battery merely by the addition of the part 29.

The many uses and advantages of this invention will be apparent to those familiar with the art. It will be obvious that the plugs 9 and 16 may be fastened in their respective posts at any desired angle relative to the threaded members 12 and 21, so that these may be most readily accessible. They are shown in the positions illustrated merely for the purpose of clearness of the drawings and are not necessarily used in that exact position in actual practice. It will also be apparent that this invention is of value even when the parts are not made of non-corrodible metal, as they furnish a more accessible connection for storage battery terminals.

I claim:—

1. The combination with a storage battery terminal and a circuit wire, of a detachable member fitted into the storage battery terminal and attached thereto in the manner in which the circuit wire terminal is ordinarily attached, a detachable member adapted to receive and hold the end of the circuit wire terminal in the manner in which the same is ordinarily held in the battery terminal, and means to connect the two auxiliary members together.

2. In combination with a battery terminal and a circuit wire having a tapered terminal plug, a tapered detachable plug fitted into an opening in the battery terminal post and rotatable therein, means for binding the same in place, the detachable plug being provided with a laterally projecting tongue, a detachable member provided with a socket corresponding to the opening in the battery post for receiving said tapered terminal plug of the circuit wire, means for binding the terminal plug therein, the detachable member being also provided with a tongue and means for removably connecting said tongues.

3. The combination with a storage battery terminal and circuit wire, of a non-corrodible detachable member removably attached to the battery terminal, and having a flat tongue projecting therefrom, a non-corrodible detachable member removably attached to the terminal of the circuit wire and having a tongue projecting therefrom, and means for clamping the said tongues into intimate contact with each other.

In testimony whereof, I have hereunto set my hand.

FRANCIS G. SCHMITT.

Witnesses:
    HOWARD L. SNIVELY,
    JO. BAILY BROWN.